(12) United States Patent
Allen et al.

(10) Patent No.: US 9,369,308 B2
(45) Date of Patent: Jun. 14, 2016

(54) SIGNAL TRANSMISSION REDUCING COUPLING CAUSED DELAY VARIATION

(71) Applicant: International Business Machines Corporation, Armonk, NY (US)

(72) Inventors: David H. Allen, Rochester, MN (US); Douglas M. Dewanz, Rochester, MN (US); David P. Paulsen, Dodge Center, MN (US); John E. Sheets, II, Zumbrota, MN (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 14/074,052

(22) Filed: Nov. 7, 2013

(65) Prior Publication Data

US 2015/0127879 A1    May 7, 2015

(51) Int. Cl.
  *G06F 13/20*    (2006.01)
  *H04L 25/49*    (2006.01)
  *H04L 25/00*    (2006.01)
  *G06F 13/40*    (2006.01)

(52) U.S. Cl.
  CPC ............ *H04L 25/00* (2013.01); *G06F 13/4077* (2013.01)

(58) Field of Classification Search
  None
  See application file for complete search history.

(56) References Cited

U.S. PATENT DOCUMENTS

| | | | |
|---|---|---|---|
| 6,664,839 B2 | 12/2003 | Ootake et al. | |
| 7,424,634 B2 | 9/2008 | Greeff et al. | |
| 7,605,726 B2 | 10/2009 | Byeon | |
| 7,680,226 B2 | 3/2010 | Murugan et al. | |
| 8,139,390 B2 | 3/2012 | Oh | |
| 8,341,452 B2 | 12/2012 | Dimitriu et al. | |
| 2003/0117185 A1* | 6/2003 | Ishibashi | H04L 25/0272 327/108 |
| 2003/0117301 A1* | 6/2003 | Savaria | H03K 19/00346 341/55 |
| 2005/0163207 A1* | 7/2005 | Buckwalter | H04L 25/03878 375/229 |
| 2005/0259826 A1 | 11/2005 | Kuzmenka | |
| 2012/0254488 A1* | 10/2012 | Lee | G06F 13/423 710/71 |
| 2013/0051491 A1* | 2/2013 | Kim | G06F 13/4077 375/296 |

FOREIGN PATENT DOCUMENTS

| | | |
|---|---|---|
| CN | 2528165 Y | 12/2002 |
| JP | 11-330374 | 11/1999 |

OTHER PUBLICATIONS

Jahanian, A. et al., "Higher Routability and Reduced Crosstalk Noise by Asynchronous Multiplexing of On-Chip Interconnects", Transactions D: Computer Science & Engineering and Electrical Engineering, vol. 17, No. 1, pp. 11-24, Sharif University of Technology, Jun. 2010.

Xu, Jiang, et al., "Double-Data-Rate, Wave-Pipelined Interconnect for Asynchronous NoCs" IEEE Computer Society, May-Jun. 2009, pp. 20-30.

\* cited by examiner

*Primary Examiner* — David E Martinez
(74) *Attorney, Agent, or Firm* — Robert R. Williams

(57) ABSTRACT

A signaling bus having a plurality of adjacent logical lanes, each logical lane having an odd signal path and an even signal path. Driving circuitry drives each logical lane by transmitting, if data has changed from an immediately preceding cycle, a one cycle signal having a first transition direction on the even signal path on even cycles and transmitting a one cycle signal having the first transition direction on odd cycles. If data has not changed, transmitting a two cycle signal having a second transition direction on the even signal path on even cycles and transmitting a two cycle signal on the odd path having the second transition direction on odd cycles. Receiver circuitry alternates selection of the even cycle path and the odd cycle path to determine if data has changed from the immediately preceding cycle.

10 Claims, 8 Drawing Sheets

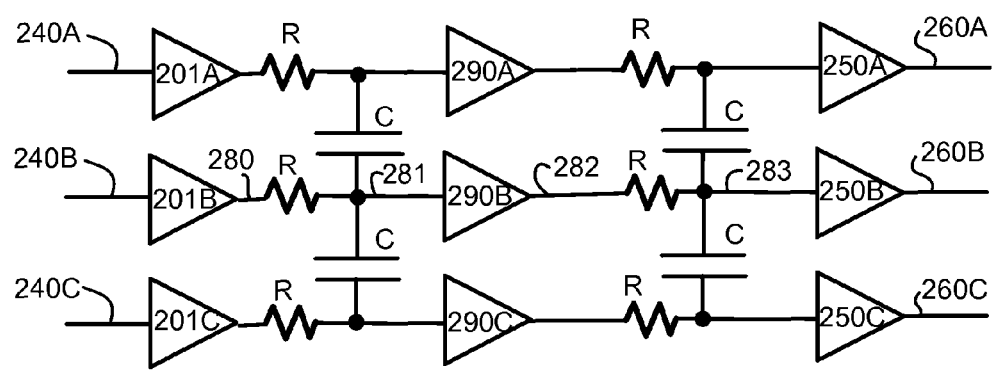
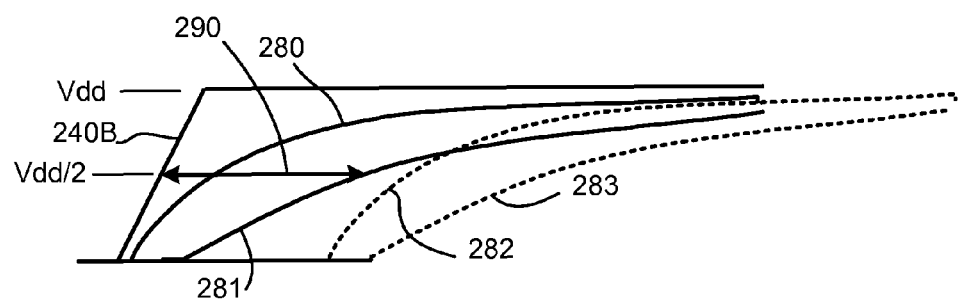
Fig. 2
Prior Art

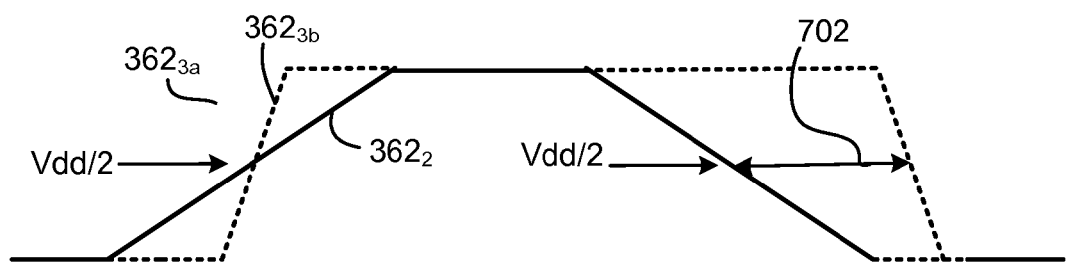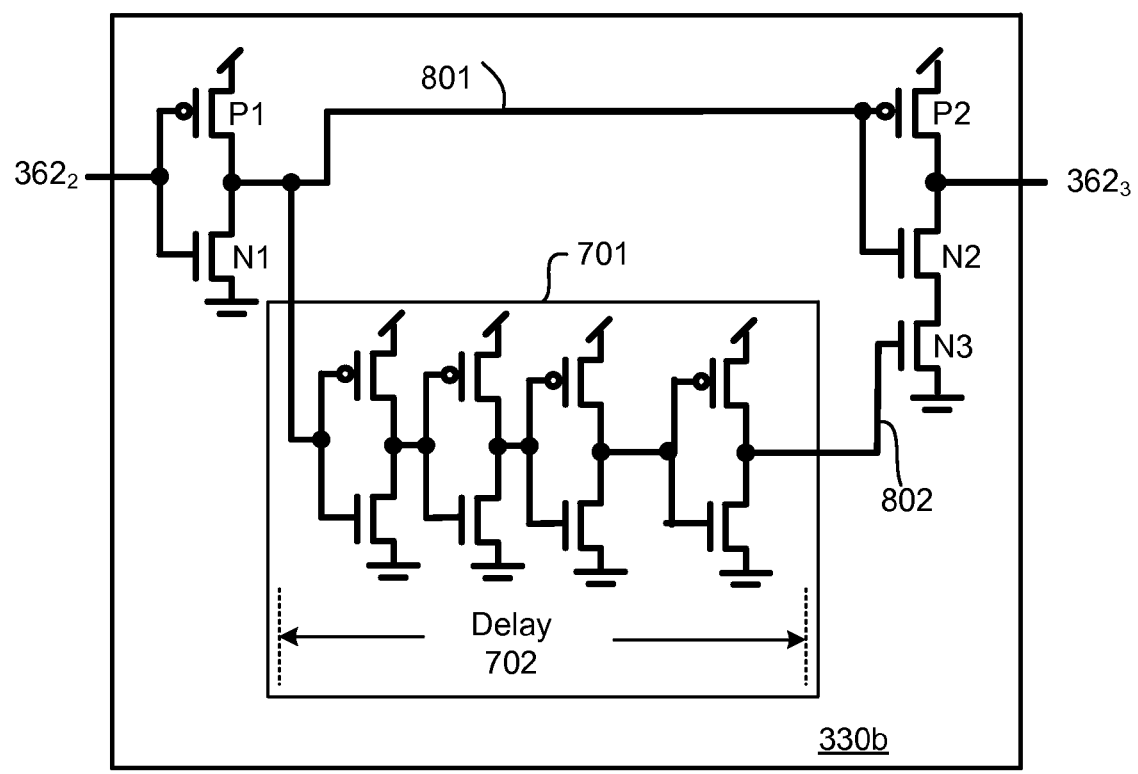
Fig. 8

SIGNAL TRANSMISSION REDUCING COUPLING CAUSED DELAY VARIATION

FIELD OF THE INVENTION

This invention relates generally to electrical signaling. More specifically the invention relates to reducing transition time degradation and delay on a signal path caused by neighboring signal paths switching.

BACKGROUND OF THE INVENTION

Having reference now to prior art FIG. 1A, a conventional signaling arrangement 100 is shown, having a plurality of drivers in block 101, a plurality of receivers in block 150 to receive signals driven by the plurality of drivers in block 101, and a plurality of signal paths 120 (120A, 120B, 120C are referenced) to couple the plurality of drivers in block 101 to the plurality of receivers in block 150.

In FIG. 1B, three signal paths 120 (120A, 120B, 120C) are depicted, with parasitic capacitors 130 (130AB, 130BC) coupling signal path 120B to adjacent neighbors 120A and 120C. It is well known that $$I = C \cdot dV/dt$$

When signal paths 120A and 120C are not switching, transition rate $d(V-Gnd)/dt$, on signal path 120B will have a particular rate based on the driver-supplied I (current) and the capacitance driven (130AB and 130BC, and possible additional capacitances not shown).

When signal paths 120A and 120C are switching at the same time and in the same direction as signal path 120B, there is no dV/dt across capacitors 130AB and 130BC, and signal path 120B will therefore switch faster (have a faster transition rate) than when signal paths 120A and 120C are not switching.

On the other hand, when signal paths 120A and 120C are switching at the same time and in opposite direction as signal path 120B, dV/dT across capacitors 130AB and 130BC are effectively doubled, and the transition rate on signal path 120A will be slowed down, increasing delay from a driver 101B to receiver 150B.

In the waveforms of FIG. 1B, the bottom waveforms show signal paths 120A (120A1) and 120C (120C1) both rising; corresponding waveform of signal path 120B (120B1) is shown to rise relatively fast in the upper waveforms. In the case when signal path 120B (120B3) is rising but signal paths 120A (120A3) and 120C (120C3) are falling, transition of signal path 120B is showed down (as will be signal paths 120A and 120C, depending on switching signal paths that may be coupled on other sides of signal paths 120A and 120C). When signal paths 120A and 120C are not switching, signal path 120B2 will have a transition faster than signal path 120B3 but slower than 120B1. Other transitions will be apparent, such as transition of signal path 120A in the same direction as 120B but signal path 120C switching in the opposite direction of signal path 120B.

The timing uncertainties described briefly above may cause significant increases in signal propagation times resulting in difficulties in achieving "late mode" timing as the signals may arrive too late and not be reliably clocked into a latch. On the other hand, when signals are switching in a same direction, difficulties may arise in achieving "early mode" timing as signals may arrive at a latch before a previous clock has ended.

FIG. 2 shows a prior art drawing of, again, three parallel signal paths, but having one or more repowering buffers to facilitate signal propagation in resistive signal paths. It will be understood that the adjacent switching coupling effects apply to signal paths having resistive signal paths as well as signal paths having little series resistance. As shown in FIG. 2, drivers 201 (201A, 201B, 201C) drive signals on respective signal paths. Buffers 290 (290A, 290B, 290C) repower RC (resistive-capacitive) degraded signals. Receivers 250 (250A, 250B, 250C) receive the signals at receiver ends of the signal paths and drive signals 260 (260A, 260B, 260C) to logic blocks.

In the waveform shown, input signal 240B is driven by driver 201B at point 280. A signal at 280 is shown to rise and taper off for an extended period as current is needed to charge capacitance further down the RC signal path, the capacitance being simply drawn in FIG. 2 as the two capacitors referenced as "C". A waveform for point 281, at input of repowering buffer 290B is shown, delayed and degraded from the waveform at point 280. It will be recognized that the "R" and the "C" are in fact distributed between points 280 and 281 and the drawing of FIG. 2 is simplified for example. Similar waveforms will occur for the segment having points 282 and 283. Without repowering block 290B, a waveform at point 283 would be even more dramatically delayed and degraded.

SUMMARY OF EMBODIMENTS OF THE INVENTION

Embodiments of the invention provide reduction or elimination of coupling caused delay variations in a signaling bus. Embodiments of the invention provide for fast transition rates for signals of a first transition direction and slower (and/or delayed) transition rates for signals of a second direction, allowing repowering blocks to switch at a switching threshold that speeds signals of the first transition direction versus signals of the second direction.

In a method embodiment of the invention a signaling bus has a plurality of logical lanes, each logical lane being physically adjacent to at least one other logical lane. Each logical lane comprises an even signal path and an odd signal path. The method ensures that a one cycle path having a first transition direction transmitted on a first signal path in the signaling bus never encounters a one cycle signal having a second transition transmitted on an adjacent second signal path in the signaling bus.

In an apparatus embodiment of the invention, the apparatus includes a circuit to alternate between an even cycle and an odd cycle of a clock. The apparatus includes a signaling bus having a plurality of logical lanes having a first logical lane physically adjacent to a second logical lane, each logical lane having an even signal path and an odd signal path. The apparatus includes driving logic to compare a current data value with an immediately previous data value, and, if the current value differs from the immediately previous value, drive a one cycle signal with a first transition direction on the even signal path on an even cycle and drive a one cycle signal with the first transition direction on the odd signal path on an odd cycle, and, if the current value is the same as the immediately previous value, drive a two cycle signal with a second transition direction on the even signal path on an even cycle and drive a two cycle signal with the second transition direction on the odd signal path on an odd cycle. The apparatus includes a receiving logic to alternate selection of the even signal path and the odd signal path and changing a value of output data when the selected path has a value indicating that transmitted data has changed.

In an embodiment of the invention, a signal in the first transition direction is driven faster than a signal in the second transition direction.

In an embodiment of the invention, a signal in the second transition direction is delayed from a signal in the first transition direction.

In an embodiment of the invention, one or more repowering blocks are placed along both the even signal path and the odd signal path. Each repowering block may retransmit signals of the first transition direction faster than retransmit signals of the second transition direction.

BRIEF DESCRIPTION OF THE DRAWINGS

FIG. 2 shows three signal paths having a distributed RC network on each signal path. Each signal path is shown to have at least one repowering buffer. FIG. 2 also shows exemplary waveforms.

FIG. 8 shows a circuit diagram and waveforms where a rising delay is not delayed and a falling delay is delayed.

DETAILED DESCRIPTION OF THE EMBODIMENTS

Electronic systems, such as computers, electronic gaming systems, and the like typically employ signaling buses to carry information from a driver to a receiver. For purposes of explanation herein, such high speed signaling buses will use intra-chip (that is from drivers on a chip to receivers on the same chip) signaling buses for examples. However, inter-chip (chip to chip) signaling is also contemplated.

A problem with signaling buses, having a number of parallel signal paths, is that simultaneously switching edges affect transition rates and delays because of parasitic capacitance from a particular signal path to adjacent signal paths. In addition, particularly when the high speed signaling buses are on a chip, signal paths are quite resistive and RC (resistive and capacitive) effects on such signaling buses may dramatically degrade and delay signals. Repowering to sharpen up transitions along signal paths is routinely used in modern chips, but degraded waveforms may take a significantly long time to reach a conventional (e.g., Vdd/2) switching threshold.

Embodiments of the invention provide improvements in signal transmission speed, reducing time from a driver to a receiver.

Figure 1B:
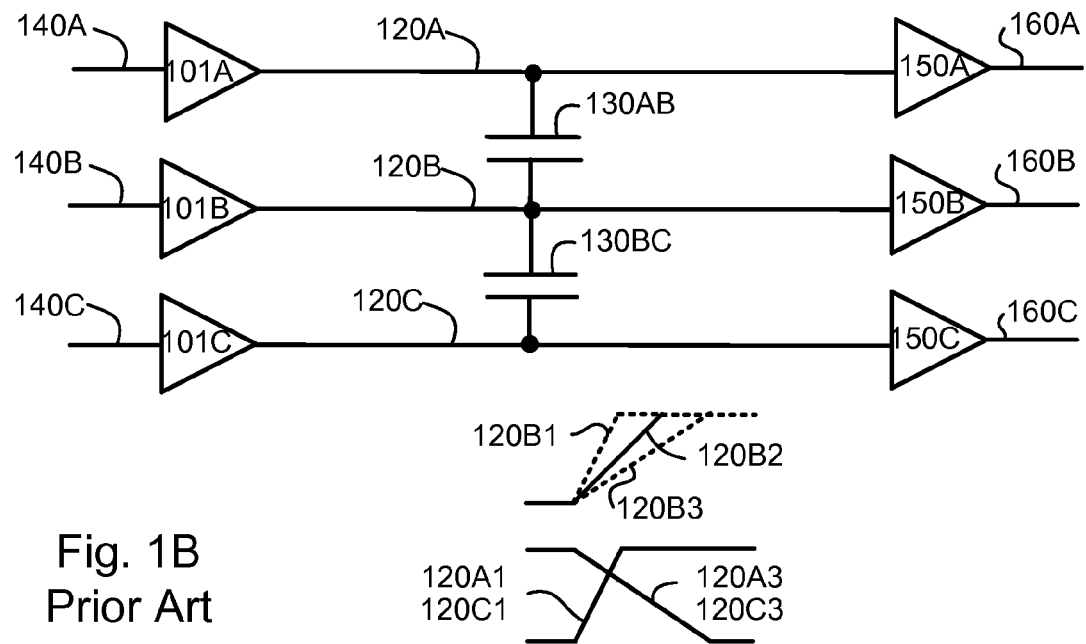
FIG. 1B shows a portion of the conventional signaling bus having three parallel signal paths on a signaling bus with capacitors coupling a first and second and the second and a third signal path. Waveforms are shown to illustrate delay effects of coupling.
Figure 1A:
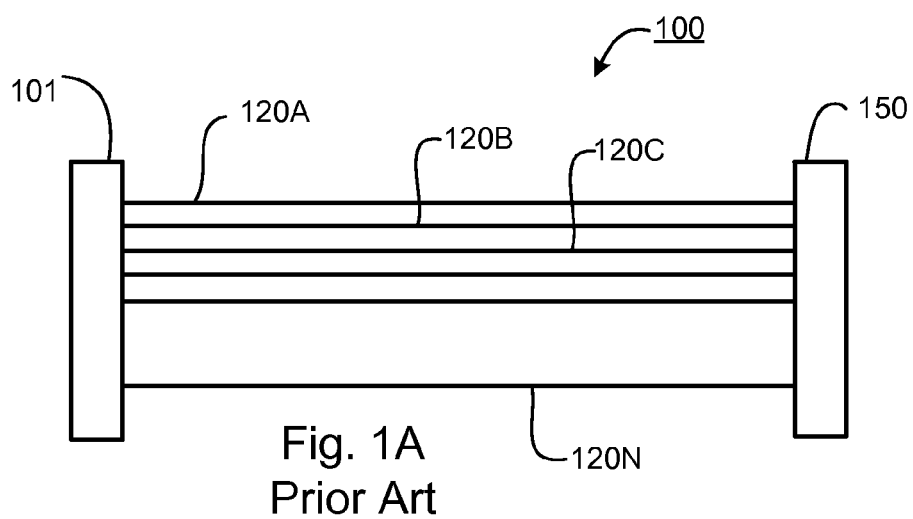
FIG. 1A shows a conventional signaling bus with parallel, adjacent, signal paths.
Figure 3:
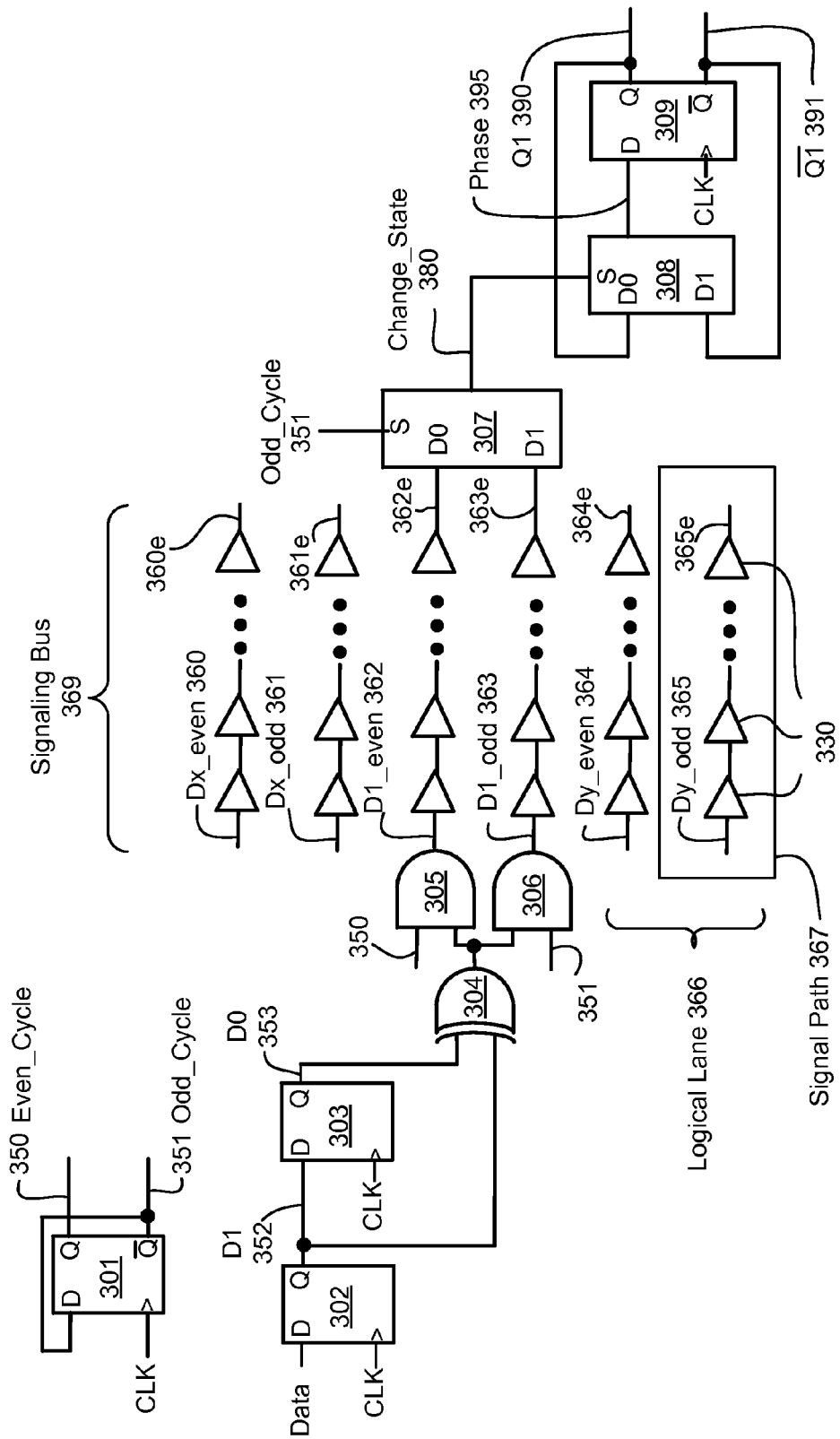
FIG. 3 shows a logic block diagram suitable for embodiments of the invention.

With reference now to FIG. 3 a structure for embodiments of the invention is depicted.

In summary, FIG. 3 shows a signaling bus having a plurality of logical lanes in which two signal paths are used for each logical lane. Each logical lane in the signaling bus is physically adjacent to another logical lane. Data for a current cycle is compared with data from an immediately preceding cycle, with the result of the comparison ANDed with an even cycle signal with a first AND gate on an even signal path and the result ANDed with an odd cycle signal with a second AND gate on an odd signal path. Signal transitions for a first switching direction are faster (higher d(V−Gnd)/dt), and/or may be delayed relative signal transitions in the opposite direction. For purposes of explanation, low to high transitions are used for the first switching direction, and high to low transitions are used for signal transitions in the opposite (second) switching direction.

Repowering blocks, in embodiments may or may not be used to periodically repower the signals as they travel down their respective signaling paths. At a receiving end of the signal paths a first selector alternately picks the even signal path or the odd signal path, and the output of the first selector drives a first selector output to indicate whether data has changed state or not. The first selector output then selects a true phase output of a data out latch or a compliment phase output of a data out latch as input to the data out latch.

For purposes of explanation, latches described herein are edge-triggered D-flip flop latches that latch and launch data at a rising edge of the clock input to the latch. Other latch types are contemplated.

For simplicity, in FIG. 3, but for completeness in definition, only one logical lane, logical lane, 366, is referenced and only one signal path, signal path, 367, is explicitly referenced.

FIG. 3 shows details of embodiments of the invention. Circuitry on a driving end of signaling bus 369 comprises, for each logical lane. For simplicity, details are shown only for a logical lane for data D1 (logic value at D1 352). Logical lane D1 may comprise one or more repowering buffers 330, a latch 302 holding a current value (D1 352) of data to transmit; a latch 303 to hold an immediately preceding data value (D0 353); an XOR (exclusive or) 304 to compare the current data value, D1 352, against the preceding data value D0 353; and AND gates 305 and 306 which drive two signaling paths beginning at nodes D1_even 362 and D1_odd 363 which together form a logical lane "D1" of signaling bus 369. Also shown is a logical lane for transmitting data "Dx", comprising Dx_even 360 and Dx_odd 361. Signal paths for the "Dx" logical lane are physically wired adjacently to the "D1" logical lane on a first side of the signal paths of the "D1" logical lane. The signal paths of logical lane for data "Dx" may comprise one or more repowering buffers 330, and ending at a receiver end at nodes 360e and 361e. Representative repowering buffers 330 are referenced in logical lane 366, signal path 367. Another logical lane, physically wired adjacently on a second side of the "D1" logical lane, is used to transmit "Dy" data, and comprises signal paths comprising Dy_even 364, Dy_odd 365, and receiver end nodes 364e and 365e. Signal paths may include one or more repowering buffers 330.

At a receiving end of signaling bus 369, each logical lane comprises a selector 307 to select between the even or odd signal path, the selection controlled by odd_cycle 351. When odd_cycle 351 is "0", 362e is selected for change_state 380; when odd_cycle 351 is "1", 363e is selected for change_state 380. Change_state 380 controls selector 308 to select Q1 390 on phase 395 when change_state 380 is "0" and to select $\overline{Q1}$ 391 on phase 395 when change_state 380 is "1". Latch 309 outputs Q1 390, which is a value of D1 as received. Latch 309 also outputs $\overline{Q1}$ 391 which is a complement of Q1 390. Selector 308 receives change_state 380 to select, for data input to latch 309, between Q1 390 if data D1 has not changed on the current cycle, $\overline{Q1}$ 391, if data D1 has changed on the current cycle. Q1 390 and $\overline{Q1}$ 391 are the value D1 and D1 complement as received.

Latch 301 is clocked every cycle with a compliment phase of latch 301 coupled to a data input of latch 301, causing latch 301 to flip state every cycle. Latch 301 outputs even_cycle 350 which is "1" on even cycles and "0" on odd cycles. Latch 301 also outputs odd_cycle 351 which is "0" on even cycles and "1" on odd cycles. While only one latch 301 is shown, it will be understood that there may be more than one latch 301, for example, a first latch 301 near latches 302 and 303 at the driver end of signaling bus 369 and a second latch 301 near selector 307 at the receiver end of signaling bus 369. In embodiments where more than one latch 301 are used, all latches 301 are synchronized using conventional techniques.

Figure 4:
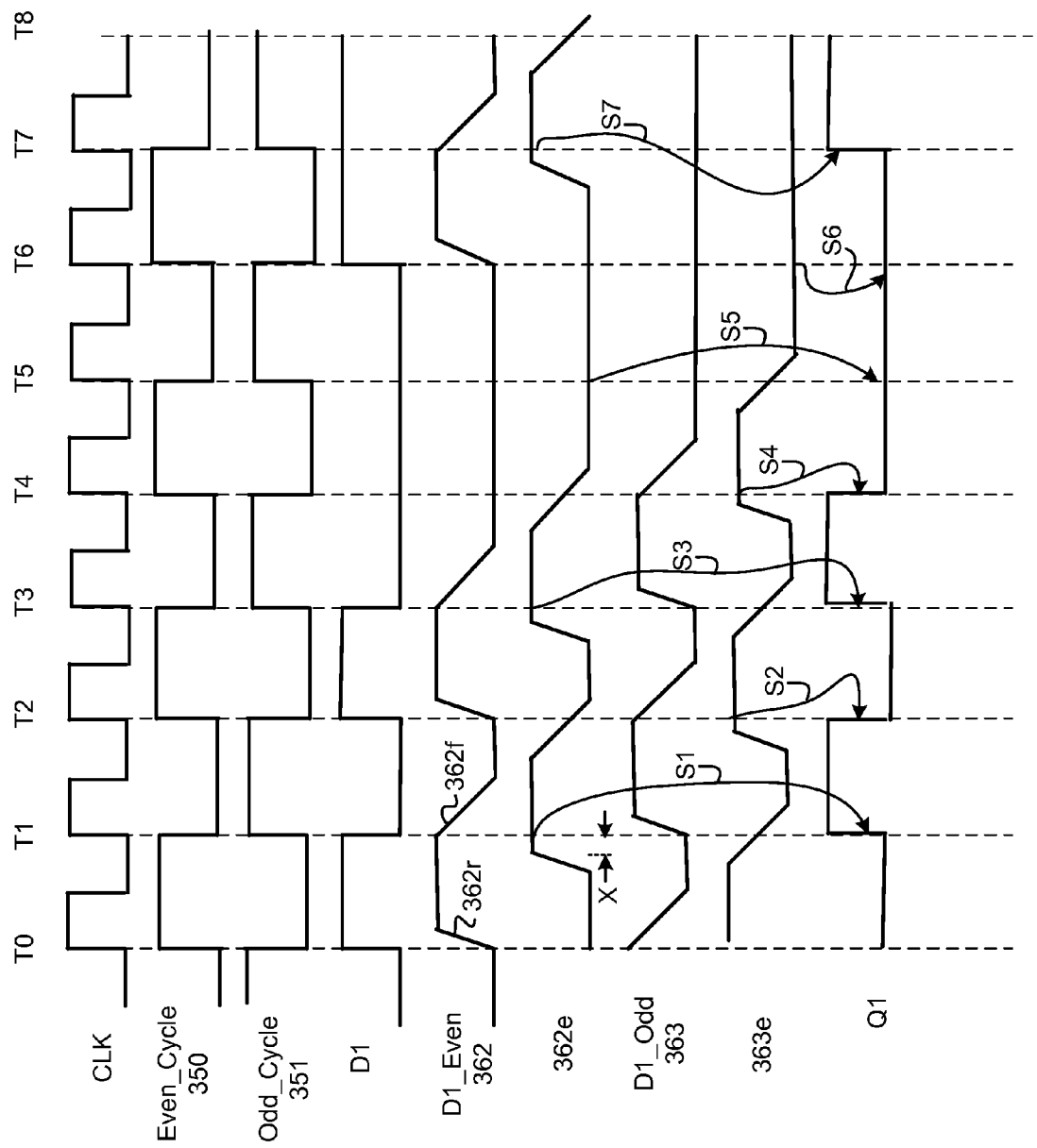
FIG. 4 shows waveforms of signals in the logic block diagram of FIG. 3.
Figure 5:
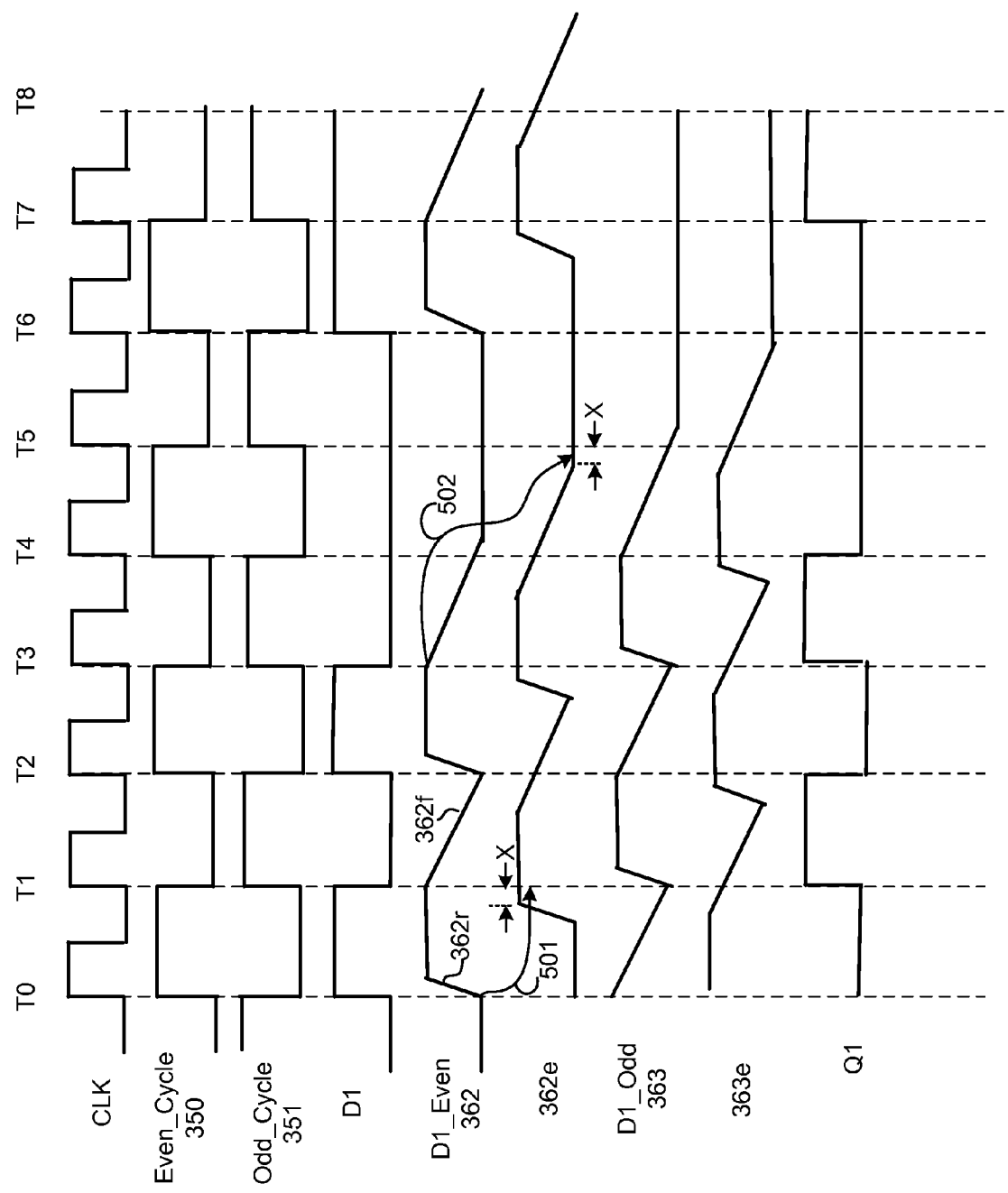
FIG. 5 shows waveforms of signals in the logic block diagram of FIG. 3 for embodiments of the invention in which falling transitions are made as slow as possible, but not delayed at start of transition.
Figure 6:
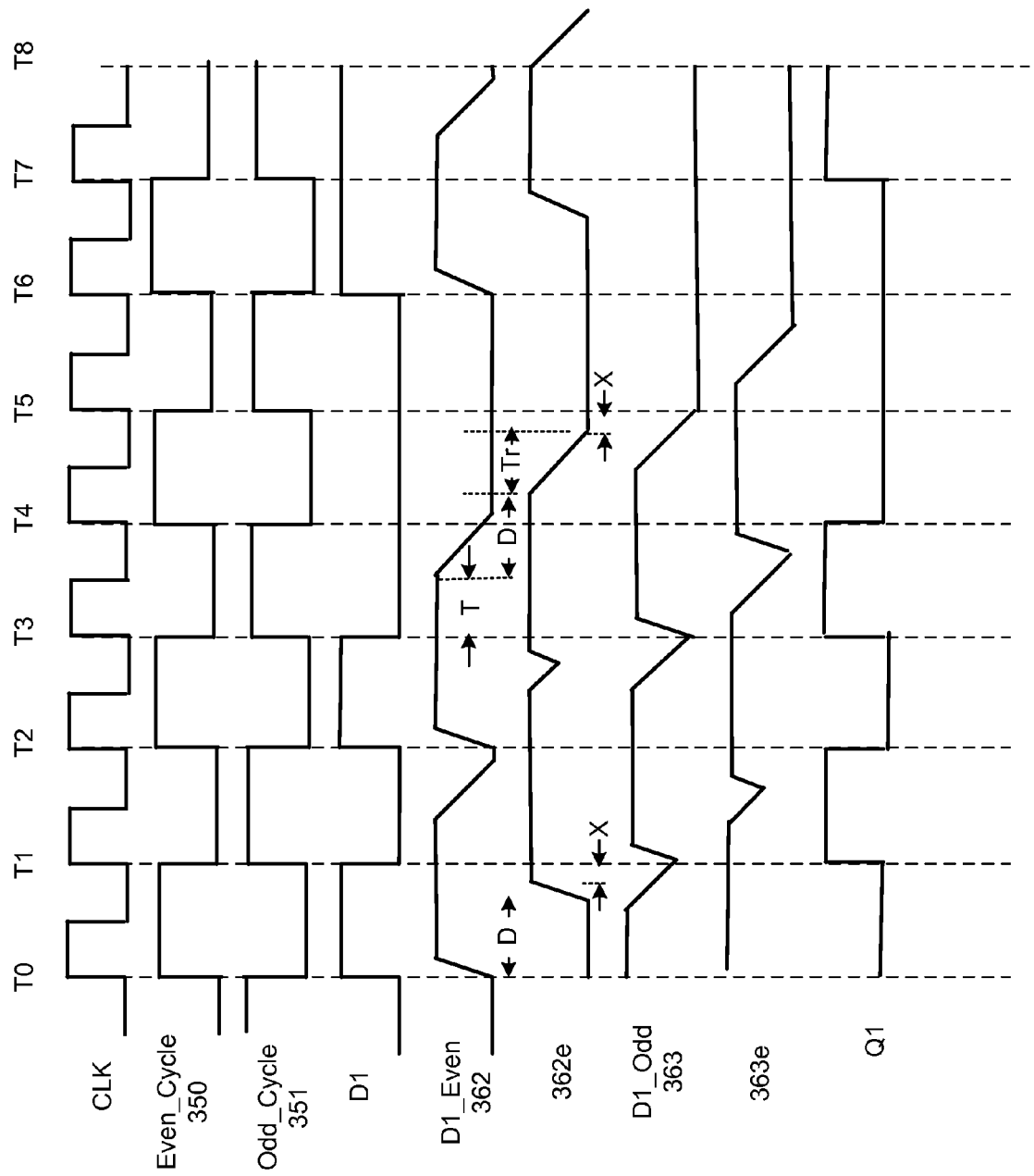
FIG. 6 shows waveforms of signals in the logic block diagram of FIG. 3 for embodiments of the invention in which falling transitions are delayed at start of transition.

FIGS. 4, 5, and 6 show exemplary waveforms with reference to nodes shown in FIG. 3.

CLK is shown to have cycles T0 to T8. Latch 301 produces "1" for even_cycle 350 for clock cycles T0, T2, T4, T6 and so on, and produces "1" for odd_cycle 351 for clock cycles T1, T3, T5, T7 and so on.

D1, the data to be transmitted in the example waveforms of FIGS. 4, 5, and 6, is "1" for clock cycles T0, T2, T6, and T7, and "0" for clock cycles T1, T3, T4, and T5.

D1_even 362 rises at T0 because D1 differs from D0 (previous value of data which is stored in latch 303). T0 is an even cycle so even_cycle 350 is "1" and XOR 304 outputs a "1" because D0 353 and D1 352 differ, causing AND 305 to output a "1". FIG. 4 references the rising edge of D1_even 362 at T0 as 362r and 362r is shown to have a fast rise time. AND 305 may be, in CMOS technology, be designed as a NAND followed by an inverter having a strong PFET (P-channel Field Effect Transistor), relative to an NFET (N-channel Field Effect Transistor) of the inverter, to strongly drive a rising output. D1_odd 363 also has a rise time faster than a fall time, shown at rise of T1 and T3.

Waveforms for 362e and 363e are shown. 362e and 363e are, respectively, the signals at D1_even 362 and D1_odd 363 at the receiver end of signaling bus 369.

At T1, even_cycle 350 goes to a "0", causing AND 305 to drive a "0" output. 362f denotes a falling edge of the "0" output and 362f is shown to be a relatively slow transition, that is, falling d(V−Gnd)/dt is slower than AND 305's rising d(V−Gnd)/dt. The relatively slow falling transition can be accomplished by having an NFET pull down FET of the output inverter of AND 305 being relatively weak compared to the PFET pull up FET of the output inverter of AND 305. See FIG. 7 and related discussion for additional circuit details.

At a beginning of T1, Q1 goes from "0" to "1". 362e has gone to "1" early enough (shown as "X" time before T1 rises in FIG. 4) to have the "1" selected by selector 307 by odd_cycle 351 being "0" to make change_state 380 be "1"; change_state 380 being "1" causes selector 308 to select $\overline{Q1}$ 391 for input to latch 309, causing latch 309 to change state to "1" when T1 rises. Arrow S1 indicates the 362e to Q1 transition.

363e rises prior to T2 rising (with enough time for 363e to propagate through selector 307 and change_state 380 to select $\overline{Q1}$ 391 for input to latch 309). D1_odd 363 rose responsively to T1 rising, driven by AND 306 (odd_cycle 350 is "1"; D1 is "0" and the previous data (D0, which arrived at T0) is "1" causing XOR 304 to output a "1"). 363e arrives at selector 307 prior to an end of T1 cycle. A "1" on 363e and a "1" on odd_cycle 351 prior to T2 rising (such as "X" time discussed earlier) sends a "1" on change_state 380 to selector 308, causing $\overline{Q1}$ 391 to be selected for input to latch 309, causing latch 309 to flip when T2 rises and Q1 to be output as a "0". "S2" indicates the 363e to Q1 transition.

At T3, D1_even 362 falls because even_cycle 350 provides a "0" input to AND 305. "S3" shows 362e causing a state flip in latch 309 in the manner explained above.

At T4, D1_even 362 remains at "0" because XOR 304 outputs a "0" (D0 353 and D1 352 are both "0". S4 shows that 363e being "1" causes latch 309 to flip to a "0" in a manner as explained above.

At T5, D1_even 362 remains at "0" because even_cycle 350 provides a "0" input to AND 305. "S5" shows 362e is "0" at T5 resulting in a change_state 380 value of "0", causing Q1 390 to be selected for input to latch 309 which then does not change state.

At T6, D1_even 362 rises because even_cycle 350 is "1" and XOR 304 outputs a "1" (D0 is "0"; D1 is "1"). "S6" shows 363e at "0"; again change_state 380 is "0" and latch 309 does not change state.

At T7, D1_even 362 falls because even_cycle 350 provides a "0" input to AND 305. Node 362e is "1" at a rising edge of T7; "S7" indicates the "1" on node 362e causes change_state 380 to cause latch 309 to flip.

Note that 362e and 363e are alternately selected, as easily seen by the "S1" . . . "S7" arrows. Note also that rising signals must be fast as they are sampled at the end of a single cycle. Falling signals may be much slower, and/or may be delayed, as falling signals have two cycles before they are sampled, for example D1_odd 363 falls at T4, but 363e is not sampled until T6.

In the example waveforms of FIGS. 4, 5, and 6, all rising waveforms are shown to be faster (faster transition) than corresponding falling waveforms. FIG. 6 shows an embodiment in which a falling transition could be fast, even as fast as the rising transition on an adjacent signal path, without adversely affecting transition rate of the rising waveform as long as the falling transition does not occur when the rising transition occurs. Therefore, when physical layout is done such that even and odd signaling paths in a signaling bus 369 alternate, a fast rise time signal (faster than a fall time in the assumed fast rise and slow fall example being considered) will never be interfered with by a simultaneous fast fall time on a neighboring signal path which would cause additional delay on the fast rise time signal, and the fast rise time signal will never be sped up by a fast rise time on an adjacent signal path which would decrease delay on the fast rise time signal. In the example of FIG. 4, falling transitions are shown to start at the same time as rising transitions, so a fast rise time may be slightly affected by a slow fall time. Effect on a fast rise time caused by a slow fall time can be less than a 30% increase in transition rate of the rise time, although greater or lesser effects are contemplated. Even this small effect can be eliminated by delaying falling transitions, which will be discussed later with reference to FIG. 6.

In FIG. 4, "X" is shown as a timing requirement between a rising signal at 362e and T1. All rising signals are single cycle paths, and "X" indicates that the rising signal on 362e must arrive at some period prior to the beginning of T1. "X" must be long enough to allow a selected signal (362e or 363e) to propagate through selectors 307 and 308 and whatever setup time may be required at the D input of latch 309. "X" is technology dependent and is an amount of time prior to a clock edge at which a signal must be at a valid logic level. Although for simplicity, "X" is used for both rising and falling signals, some technologies may have different amounts of time required for rising and falling signals to be at valid logic levels prior to a clock edge.

Falling signals are two cycle paths as indicated by "X" prior to a rising edge of T5 in FIG. 5, where D1_even 362 begins falling at a rising edge of T3 and must be at a logic "0" at 362e at a time "X" prior to T5. Some of the two cycle falling path is time spent going through the path, and some of the two cycle path is spent making a slow transition. FIG. 5 shows arrow 501 showing that a rising signal D1_Even 362 must propagate down a signal path to an endpoint (node 362e) in a single cycle, with "X" time before the sampling clock edge. Arrow 502 shows that a falling signal D1_even 362 must propagate down a signal path to an endpoint (node 362e) in two cycles, with "X" time before the sampling clock edge. As described before, "X" provides time for delays through selectors 307 and 308 and setup time of latch 309.

Embodiments with fast fall times with slow and/or delayed rise times are also contemplated.

Embodiments of the invention may include repowering buffers 330 shown in FIG. 3. Shown for example are non-inverting repowering buffers 330 which are designed, like ANDs 305 and 306, to drive signals with fast rise time and slow fall times. In embodiments where repowering buffers 330 are inverting, a designer will alternate an inverter with a fast rise time (and slow fall time) with an inverter with a low rise time (and fast fall time) along a signaling path.

FIG. 6 shows waveforms in an embodiment of the invention wherein rising transitions are fast. As described before, rising signals are single cycle paths. Falling transitions are delayed by "T"; "D" indicates delay on a signal path, including repowering buffers 330, if any; "Tr" indicates signal transition time for a slow transition to reach a valid logic "0" level (high to low shown in FIG. 6); and "X" again denotes for how much time prior to a clock edge a signal must be at a valid logic level. Delays and transitions for the fast transitions (rising) are as explained earlier. At T3 D1_even 362 is shown to begin falling "T" after a rising edge of T3 and must be valid "X" prior to a rising edge of T5 as 362e. A falling transition is a two cycle path. "T"+"D"+"Tr"+"X" must be less than two cycles (T3 and T4). Because "T" uses up a portion of the two cycles at the end of which a falling signal must be valid, "Tr" must be chosen to have a faster transition d(V−Gnd)/dt than the maximally slow transition shown in FIG. 5. In fact, if "T" becomes longer, "Tr" must become shorter such that the two cycle falling path timing is met. In particular, if "T" were to use up an entire cycle, "Tr" would have to fall as fast as, and at the same time as, a rising signal. Therefore, "T" and "Tr" should be designed such that the falling signal either does not happen when a rising signal is occurring (thereby no degradation of the rising signal occurs), or (as shown in FIG. 4), the falling signal has a slow enough transition as to not significantly affect transition of the rising signal. As mentioned earlier, a greater than 30% degradation of a rise time caused by a slow fall time may be considered a significant effect, although greater or lesser percent allowable degradations are also contemplated when timing constraints are more critical or less critical.

Figure 7:
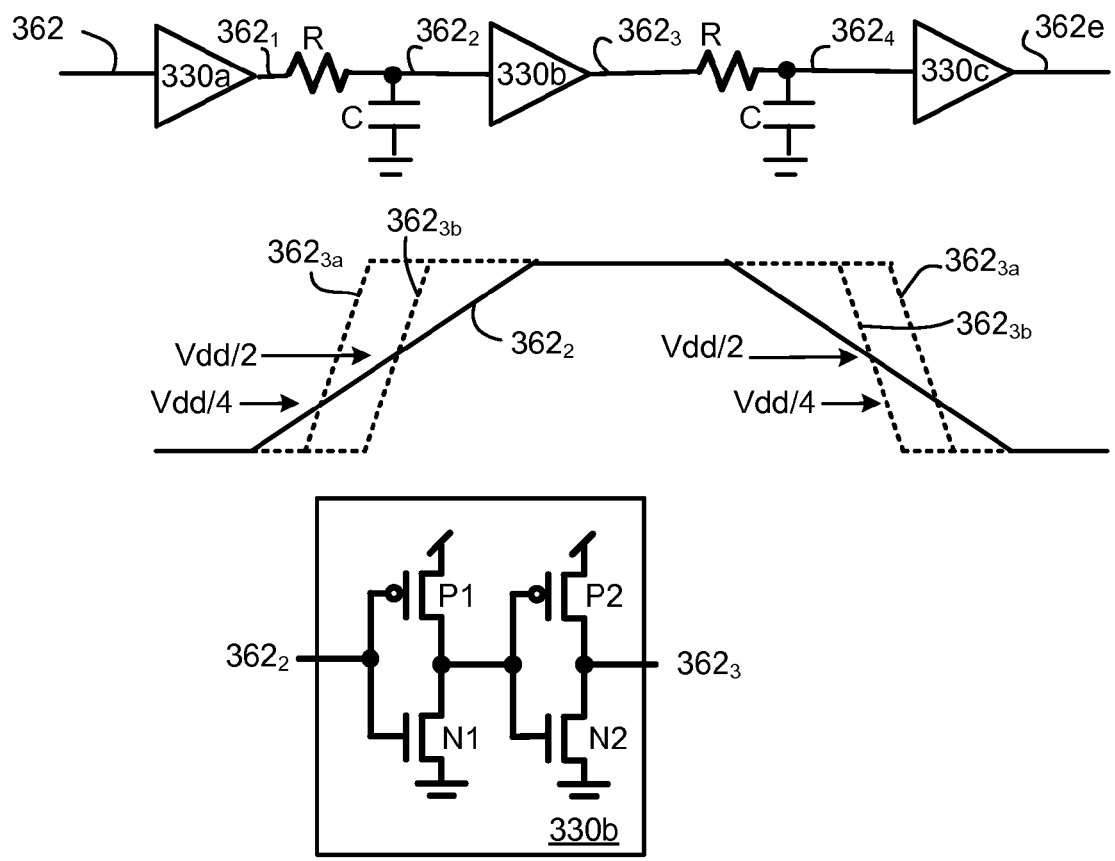
FIG. 7 shows a block diagram, a schematic, and waveforms where a repowering buffer is designed with a logic switching level lower than Vdd/2 and effects on switching.

FIG. 7 provides an exemplary circuit design schematic to explain design techniques to speed a rising signal on a resistive signal path having a repowering buffer 330a to drive node $362_1$ through a RC (R and C shown; it will be understood that both R and C will be distributed between repowering buffer 330a and repowering buffer 330b) portion of the signal path to node $362_2$. It will also be understood that although "C" in FIG. 7 is shown, for simplicity, to be coupled to Gnd, a large portion of "C" is coupled to adjacent signal paths as described above. As described before, RC signal paths both delay and degrade signals. $362_2$ shows a relatively slow rise time, due to degradation in the RC signal path at an input of repowering buffer 330b. If repowering buffer 330b is designed to switch at Vdd/2, repowering buffer 330b would drive $362_{3b}$ as shown in the waveforms. However, if repowering buffer 330b is designed to switch at a lower switch point, Vdd/4 shown for example, repowering buffer 330b will output $362_{3a}$ at a time earlier than $362_{3b}$, speeding rising signals on their way. A falling transition of $362_2$ is also shown, showing that $362_{3b}$ (Vdd/2 switching threshold) will fall at node $362_3$ before $362_{3a}$ (Vdd/4 switching threshold). That is, rising signals are hurried down the signal path; falling signals are delayed, which is acceptable since falling signals have two cycles to arrive at an end of the signaling path. Similar waveforms would apply at node $362_4$ at input to repowering buffer 330c which in turn drives node 362e.

In FIG. 7, a first inverter comprising an input to receive $362_2$, the first inverter comprising an NFET N1 and a PFET P1, N1 would be designed to be strong versus P1 (for example, N1 would have a width/length ratio that is relatively wide versus a width/length ratio of P1) to cause a switching threshold of Vdd/4. Other switching thresholds lower than Vdd/2 are of course contemplated. Output of first inverter made up of P1 and N1 will have a fast transition because the output only drives a second inverter comprising P2 and N2. P2 may be designed to be relatively strong versus N2 to provide a fast rise time and a slow fall time on node $362_3$. P2 being strong relative to N2 will cause the second inverter to have a switching threshold higher than Vdd/2, thereby also speeding up rising transitions at node $362_3$.

A delayed fall time was described with reference to FIG. 6, with a "T" delay inserted into falling signals. Such a delay may be advantageous so that signals with a fast transition will never see even a slowly falling transition; the fast transition may be at a valid logic up level before an adjacent falling transition begins, as shown in FIG. 6.

FIG. 8 provides one exemplary circuit design to provide such a delayed falling signal. Repowering block 330b of FIG. 7 is used in the present exemplary design. Input $362_2$ of repowering buffer 330b drives a first inverter comprising P1 and N1 which may be sized (width/length ratios as described above) to switch at a voltage lower than Vdd/2 as was shown in FIG. 7 and described with reference to FIG. 7. An output of the first inverter drives gates of P2 and N2. P2 may be designed to be strong versus a series N2 and N3.

When $362_2$ rises, node 801 falls, quickly turning on P2 and turning off N2 to drive $362_3$ upwards quickly.

When $362_2$ falls, node 801 rises, turning off P2 and turning on N2; however, node 802 does not rise until delay block 701 drives node 802 high after a delay 702, turning on N3. With both N2 and N3 turned on node $362_3$ will be driven low.

In the descriptions above, odd and even signal paths in a signaling bus physically alternate, ensuring that a fast transition is never "sped up" by a neighbor also transitioning fast. Teachings above have dealt with a fast transition having to deal with a much slower transition that would not greatly affect the fast transition. Teaching above have also described delaying providing transitions such that the fast transitions are not affected by the delayed, and/or slow transitions of adjacent signal paths.

If a physical layout is done where a first even cycle signal path is adjacent to a second even cycle signal path, a designer must be aware that, when both have rising signals, both signals will arrive at the signaling path ends earlier than if the adjacent signal path were not switching (or switching slowly). Similar results for odd cycle signal paths would occur. Likewise, if signals on adjacent even (or odd) cycle signal paths fall at the same time, the falling signals would arrive at the respective signal path endpoints earlier than if the adjacent signal were not switching.

What is claimed is:

1. A method of driving a signaling bus having a plurality of logical lanes, each logical lane physically adjacent to at least one other logical lane, each logical lane having an even signal path and an odd signal path, the method comprising:
    ensuring that a one cycle signal having a first transition direction transmitted on a first signal path in the signaling bus never encounters a one cycle signal having a second transition direction transmitted on an adjacent second signal path in the signaling bus;
    determining, for each logical lane, if a current data to be transmitted in each logical lane is different than an immediately previous data transmitted in the each logical lane;
    if different, then transmitting a one cycle signal having the first transition direction on the even signal path and transmitting a two cycle signal having the second transition direction on the odd signal path for even clock cycles, and transmitting a one cycle signal having the first transition direction on the odd signal path and transmitting a two cycle signal having the second transition direction on the even signal path for odd clock cycles;
    if not different, then not transmitting a one cycle signal having the first transition direction on either of the even signal path and the odd path.

2. The method of claim 1, a transition rate of the first transition direction being faster than a transition rate of the second transition direction.

3. The method of claim 2 further comprising placing repowering blocks in the even signal path and in the odd signal paths, the repowering blocks configured to have a switching threshold that speeds transmission of the first transition direction and delays transmission of the second transition direction.

4. The method of claim 1, further comprising delaying transmitting the two cycle signal relative to transmitting the one cycle signal.

5. The method of claim 1, further comprising:
    at a receiving end, alternately selecting between the even signal path and the odd path to determine if data has changed, and causing a state change in a latch if data has changed.

6. An apparatus comprising:
    a circuit to alternate between an even cycle and an odd cycle;
    a signaling bus having a plurality of logical lanes having a first logical lane physically adjacent to a second logical lane, each logical lane having an even signal path and an odd signal path;
    driving logic to compare a current data value with an immediately previous data value, and, if the current value differs from the immediately previous value, drive a one cycle signal with a first transition direction on the even signal path on an even cycle and drive a one cycle signal with the first transition direction on the odd signal path on an odd cycle, and, if the current value is the same as the immediately previous value, drive a two cycle signal with a second transition direction on the even signal path on an even cycle and drive a two cycle signal with the second transition direction on the odd signal path on an odd cycle;
    receiving logic to alternate selection of the even signal path and the odd signal path and changing a value of output data when the selected path has a value indicating that transmitted data has changed.

7. The apparatus of claim 6, further comprising:
    the driving logic configured to drive the first transition direction at a faster transition rate than the second direction.

8. The apparatus of claim 6, further comprising:
    the driving logic configured to drive the two cycle signal at a time delayed from the one cycle signal.

9. The apparatus of claim 6, the even signal path and the odd signal path further comprising one or more repowering buffers.

10. The apparatus of claim 9, the repowering buffers configured to speed transmission of signals having the first transition direction and to slow transmission of signals having the second transition direction.

* * * * *